(12) United States Patent
Kitai

(10) Patent No.: US 9,342,898 B2
(45) Date of Patent: May 17, 2016

(54) IMAGE INSPECTION SYSTEM, IMAGE INSPECTION METHOD, AND RECORDING MEDIUM STORING IMAGE INSPECTION PROGRAM

(71) Applicant: Ricoh Company, Ltd.

(72) Inventor: Tadashi Kitai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 89 days.

(21) Appl. No.: 14/468,274

(22) Filed: Aug. 25, 2014

(65) Prior Publication Data

US 2015/0063654 A1    Mar. 5, 2015

(30) Foreign Application Priority Data

Sep. 2, 2013  (JP) ................ 2013-181220

(51) Int. Cl.
H04N 1/60 (2006.01)
G06T 7/40 (2006.01)
G06T 7/00 (2006.01)
H04N 1/409 (2006.01)

(52) U.S. Cl.
CPC ............... *G06T 7/408* (2013.01); *G06T 7/001* (2013.01); *H04N 1/4097* (2013.01); *H04N 1/605* (2013.01); *G06T 2207/10024* (2013.01); *G06T 2207/30144* (2013.01)

(58) Field of Classification Search
None
See application file for complete search history.

(56) References Cited

U.S. PATENT DOCUMENTS

2013/0016374 A1  1/2013  Kawamoto et al.
2013/0044342 A1  2/2013  Kaneko et al.
2013/0044347 A1  2/2013  Kitai et al.
2013/0250319 A1  9/2013  Kaneko et al.
2014/0036290 A1  2/2014  Miyagawa et al.
2014/0079292 A1  3/2014  Kaneko et al.
2014/0079293 A1  3/2014  Kitai et al.

FOREIGN PATENT DOCUMENTS

JP   2005-205797   8/2005
JP   2011-116023   6/2011
JP   2012-108854   6/2012
JP   2013-005092   1/2013

OTHER PUBLICATIONS

U.S. Appl. No. 14/205,968, filed Mar. 12, 2014.
U.S. Appl. No. 14/191,935, filed Feb. 27, 2014.
U.S. Appl. No. 14/212,562, filed Mar. 14, 2014.
U.S. Appl. No. 14/212,996, filed Mar. 14, 2014.

*Primary Examiner* — Bhavesh Mehta
*Assistant Examiner* — Menatoallah Youssef
(74) *Attorney, Agent, or Firm* — Duft Bornsen & Fettig LLP

(57) ABSTRACT

An image inspection system, an image inspection method, and an image inspection program acquires a read image obtained by reading an output image, generates an inspection image for inspecting the read image based on data of a to-be-output image, acquires an inspection result including a determination whether the read image is defective, based on a difference between the inspection image and the read image, acquires coloring-material usage data indicating extent of coloring-material usage in the output image, the coloring-material usage data being read when the read image is generated, generates coloring-material usage defect rate data indicating a defect rate in association with coloring-material usage, based on the inspection result and the coloring-material usage data, and obtains coloring-material usage of the to-be-output image, based on data of pixels forming the to-be-output image.

9 Claims, 11 Drawing Sheets

SCANNED IMAGE              MASTER IMAGE

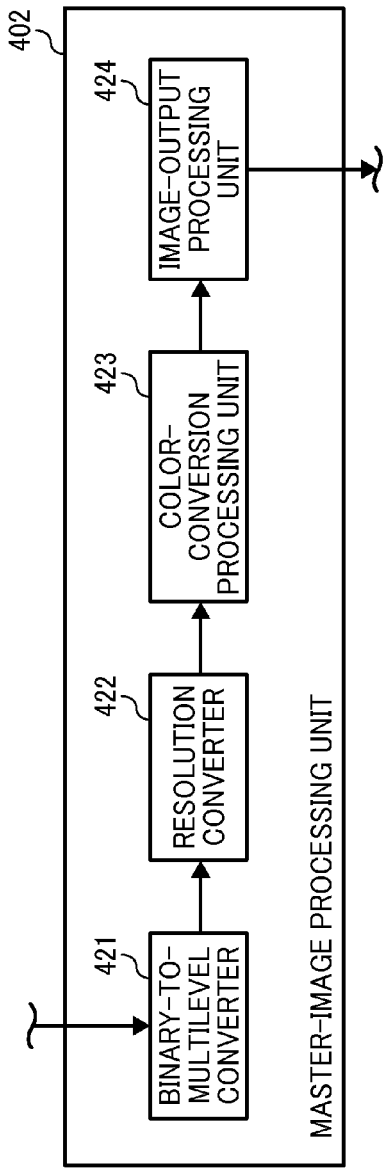

FIG. 9

| PAGE | DEFECT | X COORDINATE | Y COORDINATE | AREA | DIFFERENCE |
|---|---|---|---|---|---|
| page$_{0001}$ | def$_{0001}$ | X$_{0001}$ | Y$_{0001}$ | XXX | XXX |
| page$_{0001}$ | def$_{0002}$ | X$_{0002}$ | Y$_{0002}$ | XXX | XXX |
| page$_{0001}$ | def$_{0003}$ | X$_{0003}$ | Y$_{0003}$ | XXX | XXX |
| ... | | | | | |

FIG. 10

| PAGE | RESULT | COLORING-MATERIAL USAGE RATE | | | |
|---|---|---|---|---|---|
| | | C | M | Y | K |
| page$_{0001}$ | NG | 4% | 3% | 10% | 32% |
| page$_{0002}$ | NG | 0% | 0% | 0% | 10% |
| page$_{0003}$ | OK | 30% | 35% | 12% | 53% |
| ... | | | | | |

FIG. 11

THRESHOLD AREA: 22
THRESHOLD DIFFERENCE: 16

FIG. 12

| OBJECT RANGE | RECENT 130 PAGES | | | | | | | | |
|---|---|---|---|---|---|---|---|---|---|
| THRESHOLD DIFFERENCE | 22 | | | | | | | | |
| THRESHOLD AREA | 16 | | | | | | | | |
| COLORING-MATERIAL USAGE RATE | 0-5% | | 5-20% | | 20-40% | | 41%- | | |
| | NUMBER OF OUTPUTS | PERCENT DEFECTIVE | NUMBER OF OUTPUTS | PERCENT DEFECTIVE | NUMBER OF OUTPUTS | PERCENT DEFECTIVE | NUMBER OF OUTPUTS | PERCENT DEFECTIVE | |
| C | XXXX | XX% | XXXX | XX% | XXXX | XX% | XXXX | XX% | |
| M | XXXX | XX% | XXXX | XX% | XXXX | XX% | XXXX | XX% | |
| Y | XXXX | XX% | XXXX | XX% | XXXX | XX% | XXXX | XX% | |
| K | XXXX | XX% | XXXX | XX% | XXXX | XX% | XXXX | XX% | |

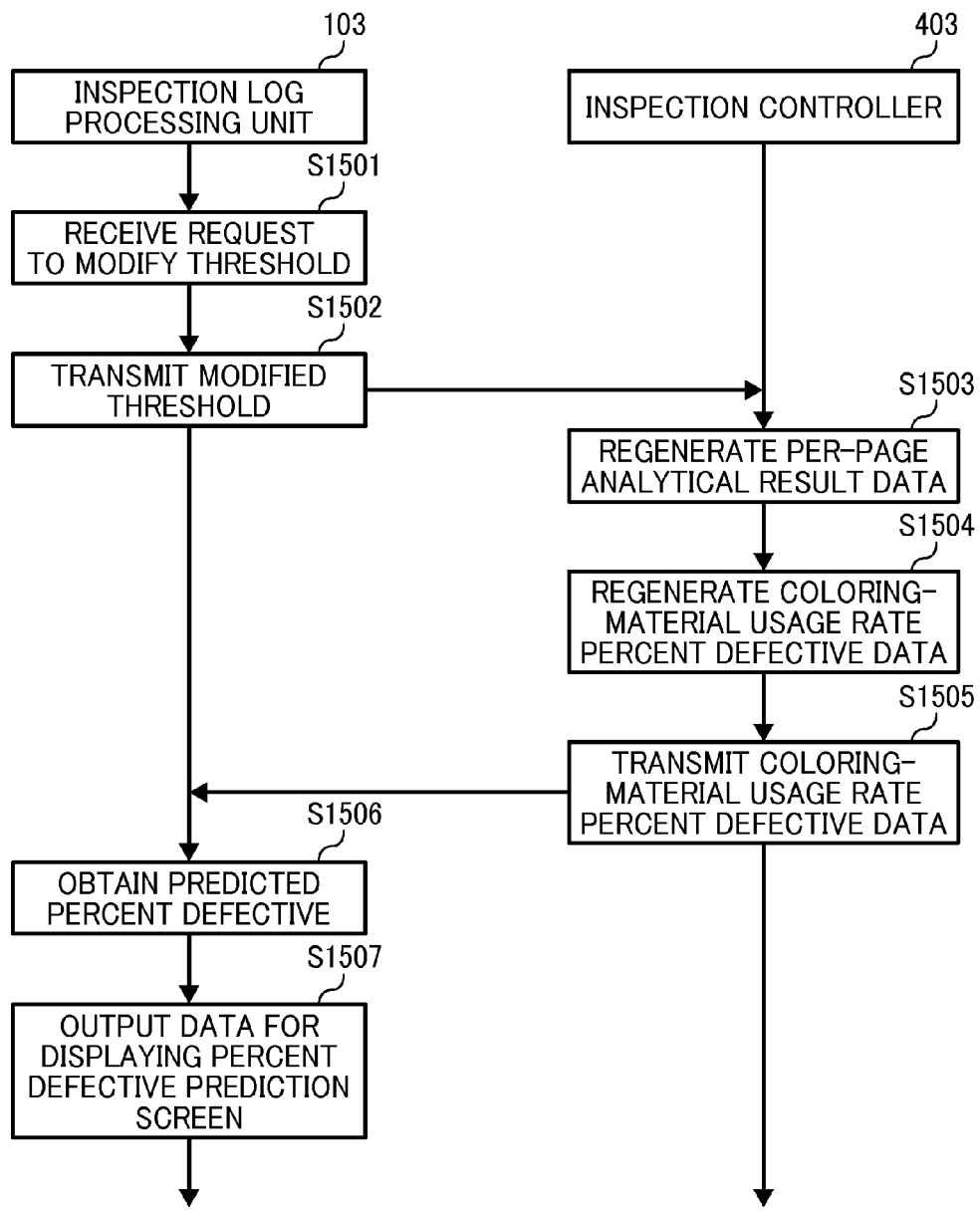

FIG. 16

|  |  | THRESHOLD AREA | | |
|---|---|---|---|---|
|  |  | 17 | 22 | 27 |
| THRESHOLD DIFFERENCE | 11 | XXX% | XXX% | XXX% |
| | 16 | XXX% | XXX% | XXX% |
| | 21 | XXX% | XXX% | XXX% |

IMAGE INSPECTION SYSTEM, IMAGE INSPECTION METHOD, AND RECORDING MEDIUM STORING IMAGE INSPECTION PROGRAM

CROSS-REFERENCE TO RELATED APPLICATION

This patent application is based on and claims priority pursuant to 35 U.S.C. §119(a) to Japanese Patent Application No. 2013-181220, filed on Sep. 2, 2013, in the Japan Patent Office, the entire disclosure of which is hereby incorporated by reference herein.

BACKGROUND

1. Technical Field

Example embodiments generally relate to an image inspection system, an image inspection method, and a recording medium storing an image inspection method.

2. Background Art

Conventionally, printed materials were manually inspected. However, apparatuses that inspect printed materials are now used as post-processing apparatuses in offset printing. Such inspection apparatuses determine whether the printed material is defective as follows. Firstly, an ideal image is manually selected from the read images of printed materials, and a master image is generated based on the selected ideal image. Then, the master image is compared with a corresponding portion of the read image of the printed material, and whether the printed material is defective or not is determined based on the degree of the difference.

Note that in such comparison of an image, a threshold difference is set in order to determine whether the printed material is defective or normal. Such a threshold is manually set based on an empirical rule or the like. The setting of a threshold is crucial because the same image may be determined to be either defective or normal depending on the threshold.

SUMMARY

Embodiments of the present invention described herein provide an improved image inspection system, an improved image inspection method, and an improved image inspection program. Each of the image inspection system, the image inspection method, and the image inspection program acquires the read image obtained by reading an output image, generates an inspection image for inspecting the read image based on data of a to-be-output image, acquires an inspection result including a determination whether the read image is defective based on a difference between the inspection image and the read image, and acquires coloring-material usage data indicating extent of coloring-material usage in the output image. The coloring-material usage data is read when the read image is generated. The system/method/program generates coloring-material usage defect rate data indicating a defect rate in association with coloring-material usage based on the inspection result and the coloring-material usage data, obtains coloring-material usage of the to-be-output image based on data of pixels forming the to-be-output image, predicts a rate of occurrence of a defect when the to-be-output image is output based on the coloring-material usage defect rate data, and outputs display data used to display a predicted defect rate indicating a rate of occurrence of a defect when the to-be-output image is output.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 6 is a block diagram illustrating the functional configuration of a master-image processing unit according to an example embodiment of the present invention.

FIG. 7 illustrates results of coloring-material usage rate calculation according to an example embodiment of the present invention.

FIG. 9 depicts an example of log data of defects, according to an example embodiment of the present invention.

FIG. 10 depicts an example of the log data of defects listed on a page-by-page basis, according to an example embodiment of the present invention.

FIG. 11 depicts an example of the thresholds set for determining whether or not a page is defective, according to an example embodiment of the present invention.

FIG. 12 depicts a coloring-material usage rate percent defective data according to an example embodiment of the present invention.

FIG. 15 is a sequence diagram illustrating the processes of calculating a difference in percent defective, according to an example embodiment of the present invention.

FIG. 16 depicts a threshold-specific predicted percent defective table according to an example embodiment of the present invention.

Figure 1:
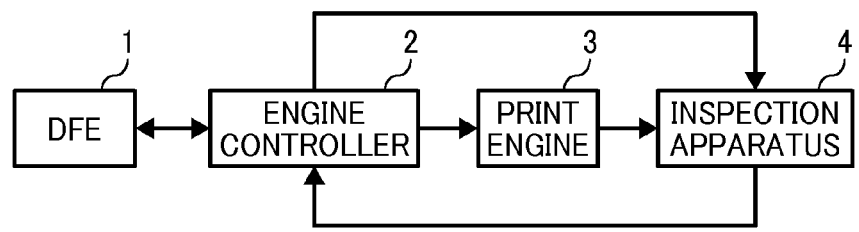
FIG. 1 illustrates a schematic configuration of an image forming system including an inspection apparatus, according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

First Embodiment

Example embodiments of the present invention are described below in detail with reference to the drawings. In the present example embodiment, an image inspection system is described including an inspection apparatus that inspects output results by comparing a master image with a scanned image obtained by scanning a formed and output image. Moreover, a method of predicting a defect incidence rate in the future inspection based on the log data of the inspection results, by using the image inspection system as described above, is described.

FIG. 1 illustrates a schematic configuration of an image forming system according to the present example embodiment of the present invention. As illustrated in FIG. 1, the image forming system according to the present example embodiment includes a digital front end (DFE) 1, an engine controller 2, a print engine 3, and an inspection apparatus 4.

The DFE 1 serves as an image processing apparatus that generates image data to be printed out, i.e., the bit map data of an image to be output, based on the received print job, and transmits the generated bit map data to the engine controller 2. Moreover, the DFE 1 according to the present example embodiment predicts a potential defect in the print job to be performed in the future, based on the results of the inspection performed by the inspection apparatus 4.

The engine controller 2 controls the print engine 3 based on the bit map data received from the DFE 1, such that an image is formed and output. Moreover, the engine controller 2 according to the present example embodiment transmits the bit map data received from the DFE 1 to the inspection apparatus 4. The inspection apparatus 4 uses the received bit map data as a source of inspection images, which are referred to when inspecting the image formed and output by the print engine 3.

The print engine 3 serves as an image forming apparatus that forms and outputs an image in accordance with the control performed based on the bit map data by the engine controller 2. The inspection apparatus 4 generates a master image based on the bit map data received from the engine controller 2. The inspection apparatus 4 serves as an image inspection apparatus that inspects an output result by comparing the generated master image with the scanned image obtained by scanning the paper output from the print engine 3 using a scanner.

When a defect is detected in the output result as a result of the comparison between the master image and the scanned image, the inspection apparatus 4 sends to the engine controller 2 the data that indicates the page on which a defect has been detected. Accordingly, the engine controller 2 controls the reprinting of a defective page. Moreover, the inspection apparatus 4 sends the inspection log data obtained by the comparison between the master image and the scanned image to the DFE 1. Accordingly, the DFE 1 can predict a defect incidence rate based on the inspection log data.

Figure 2:
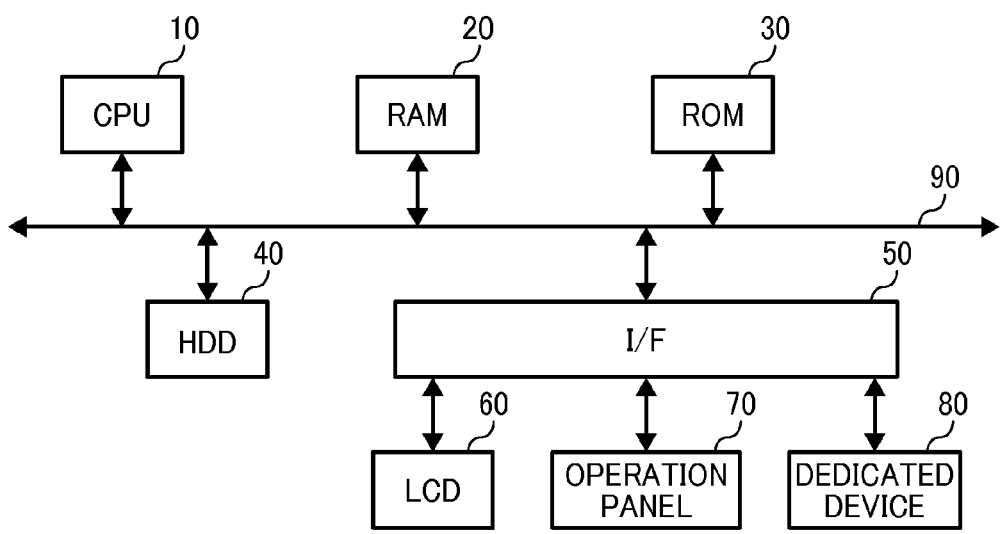
FIG. 2 is a block diagram illustrating the hardware configuration of an inspection apparatus according to an example embodiment of the present invention.

Next, the hardware configuration of a functional block of the engine controller 2, the print engine 3, and the inspection apparatus 4 according to the present example embodiment is described with reference to FIG. 2. FIG. 2 is a block diagram illustrating the hardware configuration of the inspection apparatus 4 according to the present example embodiment of the present invention. The hardware configuration of the inspection apparatus 4 is illustrated in FIG. 2, but a similar hardware configuration applies to that of the engine controller 2 and the print engine 3.

As illustrated in FIG. 2, the inspection apparatus 4 according to the present example embodiment has a configuration similar to that of ordinary information processing devices such as PCs (personal computers) and servers. In other words, a central processing unit (CPU) 10, a random access memory (RAM) 20, a read only memory (ROM) 30, a hard disk drive (HDD) 40, and an interface (I/F) 50 are connected to each other via a bus 90 in the inspection apparatus 4 according to the present example embodiment of the present invention. Moreover, the I/F 50 is connected to a liquid crystal display (LCD) 60, an operation panel 70, and a dedicated device 80.

The CPU 10 serves as a computation unit, and controls the entire operation of the inspection apparatus 4. The RAM 20 is a volatile storage medium capable of reading and writing data at high speed, and is used as a working area when the CPU 10 processes data. The ROM 30 is a read-only non-volatile storage medium in which programs for firmware or the like are stored. The volatile HDD 40 is a data readable/writable non-volatile storage medium in which an operating system (OS), various kinds of control programs, applications, programs, or the like are stored.

The I/F 50 connects various kinds of hardware, networks, or the like to the bus 90, and controls these elements. The LCD 60 is a visual user interface used to monitor the state of the inspection apparatus 4. The operation panel 70 is a user interface such as a keyboard or a mouse used to input data to the inspection apparatus 4.

The dedicated device 80 is a hardware device that implements special functions in the engine controller 2, the print engine 3, and the inspection apparatus 4. In the case of the print engine 3, the dedicated device 80 serves as a conveying mechanism that conveys paper on which an image is formed and is output, or as a plotter that forms and outputs an image on the paper. In the cases of the engine controller 2 and the inspection apparatus 4, the dedicated device 80 serves as a processing device that performs image processing on an image at high speed. Such a processing device is configured as, for example, an ASIC. Moreover, the dedicated device 80 may include a scanner that scans the image formed and output on the paper.

In such a hardware configuration, programs stored on the ROM 30, the HDD 40, or in another recording medium such as an optical disk are read by the RAM 20, and the CPU 10 performs computation according to these programs. This series of processes configures a software controller. The software controller as configured above and hardware are combined to configure a functional block that realizes the functions of the engine controller 2, the print engine 3, and the inspection apparatus 4, according to the present example embodiment of the present invention.

Figure 3:
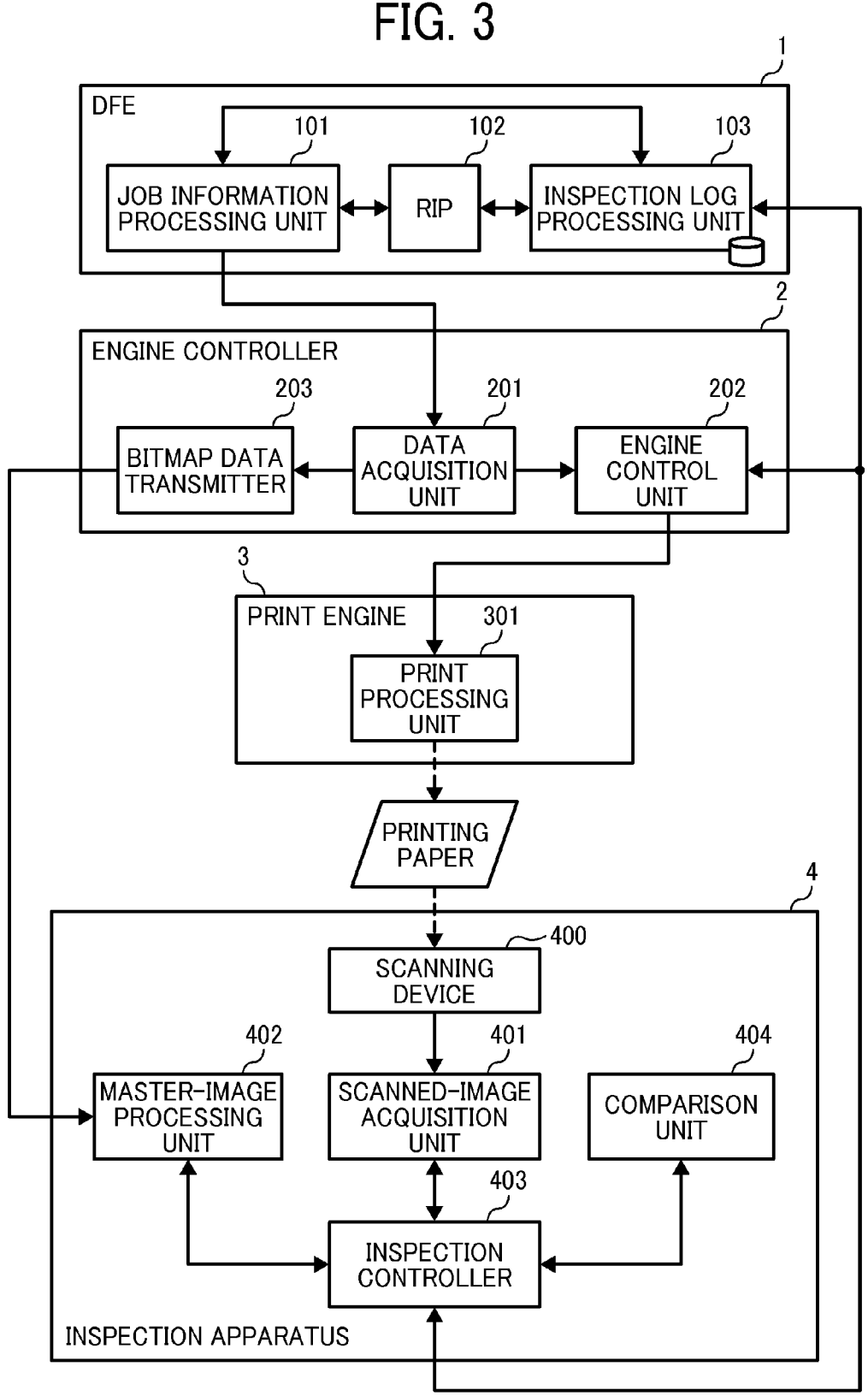
FIG. 3 is a block diagram illustrating the functional configuration of a digital front end (DFE), an engine controller, a print engine, and an inspection apparatus, according to an example embodiment of the present invention.

FIG. 3 is a block diagram illustrating the functional configuration of the DFE 1, the engine controller 2, the print engine 3, and the inspection apparatus 4, according to the present example embodiment of the present invention. Note that in FIG. 3, solid lines indicate data communication, and broken lines indicate the flow of paper. As illustrated in FIG. 3, the DFE 1 according to the present example embodiment includes a job information processing unit 101, a raster image processor (RIP) 102, and an inspection log processing unit 103. The engine controller 2 includes a data acquisition unit 201, an engine control unit 202, and a bitmap data transmitter 203. The print engine 3 includes a print processing unit 301. The inspection apparatus 4 includes a scanner 400, a scanned-image acquisition unit 401, a master-image processing unit 402, an inspection controller 403, and a comparison unit 404.

The job information processing unit 101 controls image forming and outputting processes, based on the print job input from the outside of the DFE 1 through the network and the print job generated from the image data stored in the DFE 1. When the image forming and outputting processes are performed, the job information processing unit 101 controls the RIP 102 to generate bit map data based on the image data included in the print job, and sends the generated bit map data to the data acquisition unit 201.

In response to the control performed by the job information processing unit 101, the RIP 102 generates the bit map data based on the image data included in the print job. The bit map data generated by the RIP 102 is used by the print engine 3 to perform the image forming and outputting processes. The bit map data consists of the pixels that form an image to be formed and output. The print engine 3 according to the present example embodiment performs the image forming and outputting processes based on the binary CMYK (cyan, magenta, yellow, black) images. By contrast, generally, the image data included in a print job is a multilevel image expressed as a multilevel gray scale such as 256-level gray scale per pixel. The RIP 102 generates bit map data of a binary CMYK image by converting the image data included in the print job from a multilevel image to a fewer-level image.

The inspection log processing unit 103 stores the inspection log data sent from the inspection apparatus 4, and predict, based on the stored inspection log data, a defect incidence rate for a case in which the print job obtained by the job information processing unit 101 is performed. In so doing, the inspection log processing unit 103 calculates a defect incidence rate based on the bit map data generated by the RIP 102.

The data acquisition unit 201 acquires the bit map data sent from the DFE 1, and transfers the acquired bit map data to the engine control unit 202 and the bitmap data transmitter 203. The engine control unit 202 controls the print engine 3 to perform image forming and outputting processes based on the bit map data transferred from the data acquisition unit 201. The bitmap data transmitter 203 transmits the bit map data acquired by the data acquisition unit 201 to the inspection apparatus 4 for the generation of a master image.

The print processing unit 301 obtains the bit map data sent from the engine controller 2, and serves as an image forming part that forms an image on printing paper and outputs the printing paper on which the image has been formed. The print processing unit 301 according to the present example embodiment is implemented by ordinary electrophotography, but may be implemented by other kinds of image formation mechanisms such as ink jet imaging.

The scanner 400 scans the image formed on the surface of the printing paper that is output from the print processing unit 301, and outputs the scanned image data. The scanner 400 is, for example, a line scanner disposed within the inspection apparatus 4, on a conveyance path of the printing paper output from the print processing unit 301, and reads the image formed on the paper by scanning the surface of the being-conveyed printing paper.

The scanned image generated by the scanner 400 is inspected by the inspection apparatus 4. Because the scanned image is generated by reading the surface of the paper that is output as a result of image forming and outputting processes, the scanned image represents an output result. The scanned-image acquisition unit 401 acquires the data of the scanned image, which is generated by scanning the surface of printing paper using the scanner 400. The data of the scanned image acquired by the scanned-image acquisition unit 401 is sent to the comparison unit 404 for performing a comparison. Note that the transmission of the scanned image to the comparison unit 404 is performed under the control of the inspection controller 403. In other words, the inspection controller 403 receives the scanned image, and then transfers the received scanned image to the comparison unit 404.

The master-image processing unit 402 receives the bit map data sent from the engine controller 2, as described above, and generates a master image, i.e., an inspection image, used for comparing an image to be inspected with that master image. In other words, the master-image processing unit 402 serves as an inspection image generation unit that generates a master image, i.e., an inspection image, used for inspecting the scanned image, based on the image to be output. The detailed processes of the master image generation by the master-image processing unit 402 are described later in detail.

The inspection controller 403 controls the entire operation of the inspection apparatus 4, and the elements of the inspection apparatus 4 operate under the control of the inspection controller 403. The comparison unit 404 compares the scanned image sent from the scanned-image acquisition unit 401 with the master image generated by the master-image processing unit 402, and determines whether or not image forming and outputting processes are being performed as desired. In order to perform an enormous amount of calculation at high speed, the comparison unit 404 is configured by an ASIC as described above. In the present example embodiment, the inspection controller 403 serves as an image inspection unit by controlling the comparison unit 404, and also serves as an inspection result acquisition unit that acquires the results of inspection performed by the comparison unit 404.

The comparison unit 404 compares the scanned image, which is scanned at a resolution of 200 dpi where each color of RGB is expressed by 8 bits as described above, with a master image for each corresponding pixel, and calculates a difference between the pixel values of each color of RGB expressed by 8 bits and the pixel values of the master image, on a pixel-by-pixel basis. Based on the comparison between the calculated difference and a threshold, the inspection controller 403 determines whether or not a scanned image is defective. In other words, the inspection controller 403 serves as an image inspection unit by controlling the elements of the inspection apparatus 4.

Figure 4:
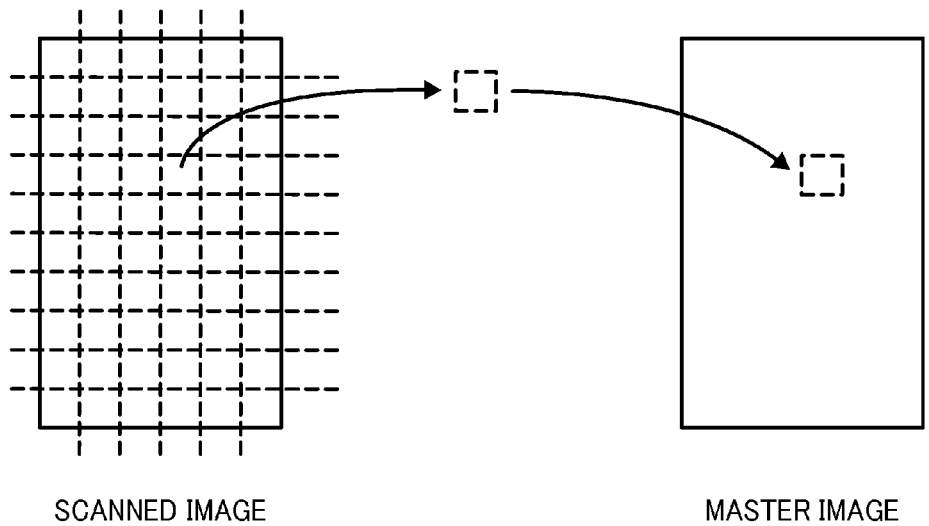
FIG. 4 illustrates a model of comparison according to an example embodiment of the present invention.

When a scanned image is compared with a master image, the comparison unit 404 calculates a difference in pixel value, i.e., a difference in density, of each pixel by superimposing a piece of the scanned image divided into specified ranges on the corresponding area of the master image, as illustrated in FIG. 4. Further, the comparison unit 404 shifts the position at which the divided piece is superimposed on the corresponding area of the master image vertically and horizontally, and determines the position at which the calculated difference becomes smallest to be an accurate superimposition point and adopts the calculated difference therein as a comparison result.

By so doing, a scanned image is aligned with a master image, and a difference is calculated. The comparison unit 404 transmits the difference calculated for each pixel and the amount of vertical and horizontal misalignment measured at the position that is determined to be the superimposition point. Note that the amount of calculation as a whole can be reduced by calculating a difference for each of the divided ranges, instead of calculating a difference upon superimposing the entire scanned image on the master image. Further, even if the scale of the scanned image is different from that of the master image, the effect of such a scale difference can be reduced by performing alignment upon dividing the scanned image into specified areas as illustrated in FIG. 4.

The inspection controller 403 according to the present example embodiment compares a difference calculated for each pixel by the comparison unit 404 with a predetermined threshold. By so doing, the inspection controller 403 obtains data indicating whether or not a per-pixel difference between a scanned image and the corresponding master image exceeds a specified threshold. In other words, it becomes possible to determine whether or not each of the pixels of the scanned image is defective. The size of the divisional areas illustrated in FIG. 4 is determined on the basis of, for example, the area for which the comparison unit 404 configured by an ASIC as described above is capable of comparing pixel values at a time.

In the example embodiment described above, cases are described in which the comparison unit 404 calculates and outputs differences between the pixels of a scanned image and the pixels of a master image and the inspection controller 403 compares each of the differences with a threshold. Alternatively, the comparison unit 404 may perform a comparison between a difference and a threshold and send its comparison results, i.e., the data indicating whether or not a per-pixel difference between a scanned image and the corresponding master image exceeds a specified threshold, to the inspection controller 403.

Figure 5:
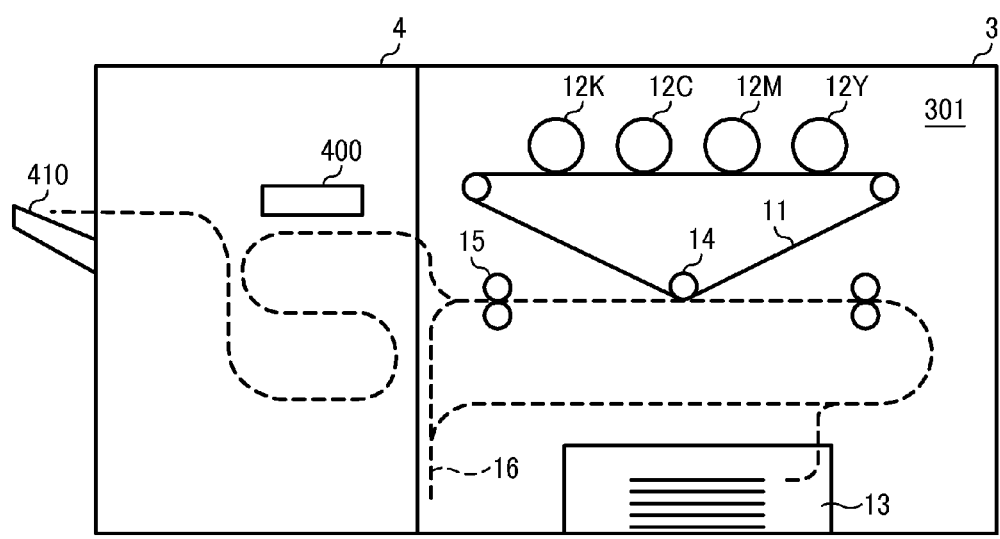
FIG. 5 illustrates the structure of a print engine according to an example embodiment of the present invention.

Next, the mechanical configuration of a part of the print engine 3 and the inspection apparatus 4, and the conveyance of paper through the apparatus along a conveyance path are described with reference to FIG. 5. As illustrated in FIG. 5, the print processing unit 301 included in the print engine 3 according to the example embodiment of the present invention has a structure in which photoreceptor drums 12Y, 12M, 12C, and 12K corresponding to four colors (they will be referred to simply as the photoreceptor drums 12) are arranged along a conveyance belt 11, which is a seamless moving body. Such a type of photoreceptor drums is called photoreceptor drums of tandem type. In other words, a plurality of photoreceptor drums 12Y, 12M, 12C, and 12K are arranged along the conveyance belt 11, which is an intermediate transfer belt on which an intermediate transfer image to be transferred to paper (i.e., an example of recording medium) fed from a paper feed tray 13 is formed, in the order listed from the upstream side of the conveyance direction of the conveyance belt 11.

The color images of toner that are respectively formed on the surfaces of the photoreceptor drums 12 of four colors are transferred to the conveyance belt 11, such that the color images are superimposed one above the other to form a full color image on the conveyance belt 11. The full color image formed on the conveyance belt 11 as above is transferred by a transfer roller 14 to paper that has been conveyed along the path, at a position where the conveyance path of paper illustrated as broken lines in FIG. 5 gets closest to the conveyance belt 11.

The paper on which the full color image has been formed is further conveyed, and the image is fixed at a fixing unit that includes a fixing roller 15. Then, the paper is ejected to the inspection apparatus 4. In the case of duplex printing, the paper on a side of which the full image has been formed and fixed is conveyed to a reverse path 16 to be reversed, and is conveyed to the transfer position of the transfer roller 14 again to receive another image on the other side of the paper.

The scanner 400 scans the surface of paper conveyed from the print processing unit 301 in the conveyance path of paper inside the inspection apparatus 4, and transmits the scanned image to the scanned-image acquisition unit 401 that is configured by an information processing device arranged inside the inspection apparatus 4. Then, the paper whose surface has been scanned by the scanner 400 is further conveyed inside the inspection apparatus 4, and is ejected to a paper output tray 410. In FIG. 5, the scanner 400 is provided on only one side of the conveyance path of paper in the inspection apparatus 4. However, the scanners 400 may be provided on both sides of the conveyance path of paper in order to inspect both sides of the paper.

Next, the functional configuration of the master-image processing unit 402 according to the present example embodiment is described with reference to FIG. 6. FIG. 6 is a block diagram illustrating the internal configuration of the master-image processing unit 402 according to the present example embodiment of the present invention. As illustrated in FIG. 6, the master-image processing unit 402 includes a binary-to-multilevel converter 421, a resolution converter 422, a color-conversion processing unit 423, and an image-output processing unit 424. Note that the master-image processing unit 402 according to the present example embodiment is realized by hardware configured as an ASIC, i.e., the dedicated device 80 described above with reference to FIG. 2. The dedicated device 80 operates in accordance with the control performed by software.

The binary-to-multilevel converter 421 generates a multilevel image by performing binary-to-multilevel conversion on a binary image that is expressed by two color tones (i.e., colorless tone and colored tone). The bit map data according to the present example embodiment is the data that is to be input to the print engine 3, and the print engine 3 performs the image forming and outputting processes based on the binary CMYK images. By contrast, a scanned image to be inspected is a multilevel image expressed by a multilevel gray scale of RGB (red, green, blue), the three primary colors, and thus the binary-to-multilevel converter 421 firstly converts a binary image into a multilevel image. An image that is expressed, for example, by 8-bit CMYK may be used as a multilevel image.

The binary-to-multilevel converter 421 depicted in FIG. 6 performs an 8-bit expansion process and a smoothing process to achieve binary-to-multilevel conversion. In the 8-bit expansion process, 1-bit data of 0/1 is expanded to 8 bits. That is, "0" remains "0" and "1" is converted into "255". In the smoothing process, an image is smoothed by applying a smoothing filter to the expanded 8-bit data.

In the present example embodiment, the print engine 3 performs image forming and outputting processes based on the binary CMYK images, and the master-image processing unit 402 includes the binary-to-multilevel converter 421. However, this configuration is merely given as an example. That is, when the print engine 3 performs the image forming and outputting processes based on a multilevel image, the binary-to-multilevel converter 421 may be omitted.

Moreover, the print engine 3 according to the present example embodiment may have capability of performing image forming and outputting processes based on a few-value image such as a 2-bit image, instead of a 1-bit image. In such cases, an 8-bit expansion process is performed to deal with the situation. In other words, a 2-bit image has four gradation values of 0, 1, 2, and 3. Accordingly, when a 8-bit expansion process is performed, gradation values of "0", "1", "2", and "3" are converted into gradation values of "0", "85", "170", and "255", respectively.

The resolution converter 422 performs resolution conversion so as to adjust the resolution of the multilevel image generated by the binary-to-multilevel converter 421 to the resolution of a scanned image to be inspected. In the present example embodiment, the scanner 400 generates a scanned image of 200 dpi. Accordingly, the resolution converter 422 converts the resolution of the multilevel image generated by the binary-to-multilevel converter 421 to 200 dpi. Moreover, the resolution converter 422 according to the present example embodiment adjusts the size of the resolution-converted image based on the magnification predetermined in consideration of the shrinkage or the like of paper output from the print processing unit 301.

The color-conversion processing unit 423 acquires an image whose resolution has been converted by the resolution converter 422, and converts the levels of gradation or color representation format of the acquired image. In the gradation-level conversion process, the color tone of a master image is adjusted to the color tone of the image formed on the paper by the print processing unit 301 and the color tone of the image scanned and generated by the scanner 400.

These processes performed by the color-conversion processing unit 423 are performed by referring to a gradation-level conversion table. The gradation-level conversion table is generated as follows. For example, an image that includes color patches of ranges of gradation is formed on paper by the print processing unit 301, and the paper processed by the print processing unit 301 is scanned to generate a scanned image. Then, the gradation values of the color patches on the scanned image are associated with the gradation values of the original image of the color patches, and the results are described in the gradation-level conversion table. In other words, the color-conversion processing unit 423 converts the gradation value of each color of the image output from the resolution converter 422, based on the gradation-level conversion table.

In the conversion of a color representation format, a CMYK image is converted into an RGB image. Because the scanned image according to the present example embodiment is an RGB image as described above, the color-conversion processing unit 423 converts a CMYK image for which a gradation-level conversion process has been performed into an RGB image. Accordingly, a multilevel image of 200 dpi where each pixel is expressed by 8-bit RGB (24 bits in total) is generated. In other words, in the present example embodiment, the binary-to-multilevel converter 421, the resolution converter 422, and the color-conversion processing unit 423 together serve as an inspection image generation unit.

Moreover, the color-conversion processing unit 423 calculates a mean value for each plane of CMYK on a page-by-page basis when one of the conversions of levels of gradation and color representation format is performed. Note that the pixel values of pixels are referred to by the color-conversion processing unit 423 when either one of the conversions of levels of gradation and color representation format is performed. The mean value described above is obtained by calculating the sum of the pixel values of pixels on one page and dividing the sum of the pixel values by the total number of pixels. For this reason, it is desired that the color-conversion processing unit 423 calculate a mean value for each plane of CMYK to increase processing efficiency.

The mean values calculated for each plane of CMYK on a page-by-page basis as above are used to calculate a coloring-material usage rate on each page, i.e., a usage rate of developer such as a toner or ink used for forming an image. In the present example embodiment, this coloring-material usage rate is used as a value that indicates the usage of coloring material. As described above, each of the pixel values of CMYK, which are referred to by the color-conversion processing unit 423 when the conversions of levels of gradation and color representation format are performed, is expressed by 8 bits, with a value ranging from 0 to 255. Accordingly, the usage rate of a coloring material can be calculated by dividing the pixel values, which has been obtained for each color, by 255.

FIG. 7 depicts the results of coloring-material usage rate calculation according to an example embodiment of the present invention. As depicted in FIG. 7, in the table of the coloring-material usage rates according to the present example embodiment, the data for identifying each "page" is associated with the data of "coloring-material usage rates" that correspond to the four colors of CMYK. The table depicted in FIG. 7 is used by the inspection log processing unit 103 to analyze the inspection log.

For this reason, the inspection controller 403 transmits to the DFE 1 the mean values calculated for the respective CMYK planes on a page-by-page basis by the color-conversion processing unit 423, and the inspection log processing unit 103 of the DFE 1 generates a table based on the received mean values calculated for the respective CMYK planes, as depicted in FIG. 7. In other words, the color-conversion processing unit 423 and the inspection log processing unit 103 work together and serve as a color material usage acquisition unit. Note that the inspection controller 403 may generate a table as depicted in FIG. 7 based on mean values calculated for the respective CMYK planes. In other words, the color-conversion processing unit 423 and the inspection controller 403 work together and serve as a color material usage acquisition unit.

Figure 8:
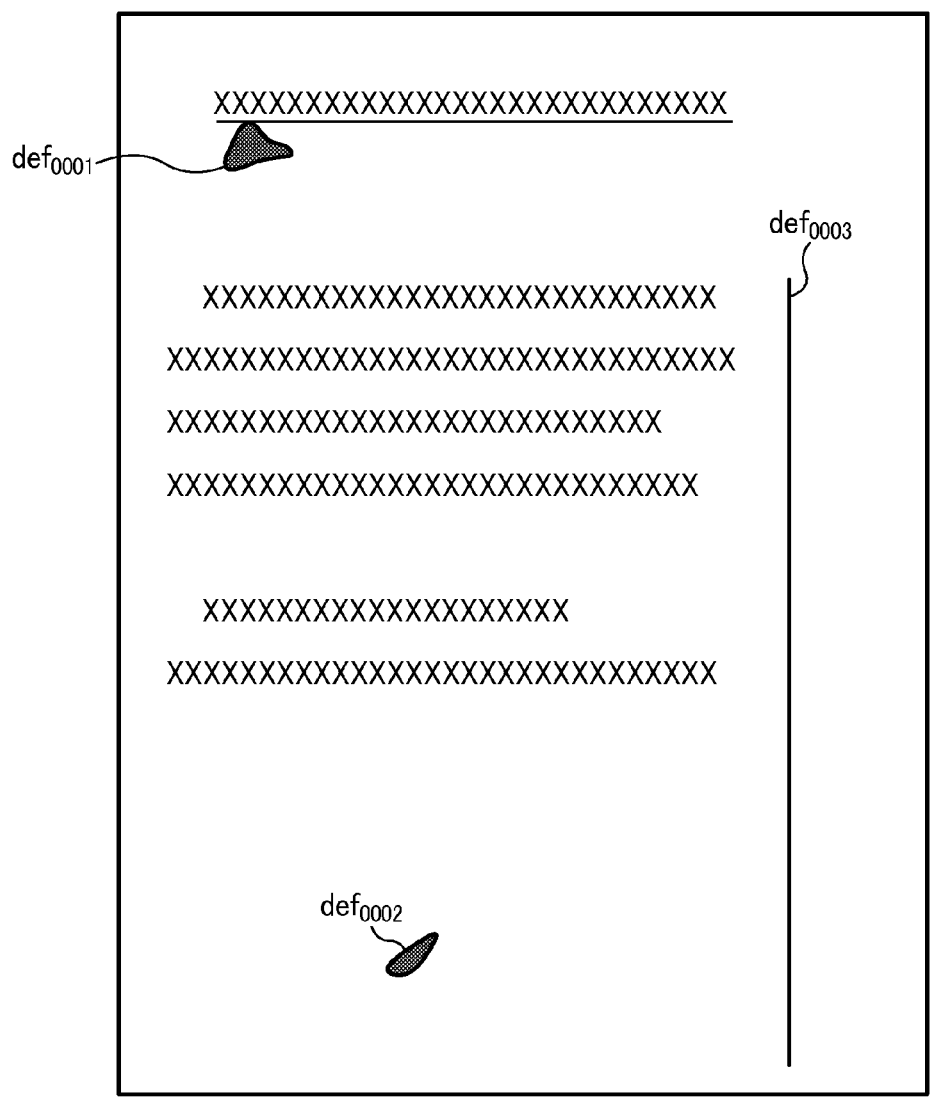
FIG. 8 illustrates defects on a page to be inspected according to an example embodiment of the present invention.

Next, the results of comparison performed on an image according to an example embodiment of the present invention are described. FIG. 8 illustrates a page to be inspected according to an example embodiment of the present invention. In FIG. 8, defects $def_{0001}$ and $def_{0002}$ that are shaped like spilled ink and a defect $def_{0003}$ that is shaped like a streak are present. These three defects are detected as a result of comparison performed with a master image.

FIG. 9 depicts an example of the log data of the results of comparison performed on a page as illustrated in FIG. 8, according to an example embodiment of the present invention. As depicted in FIG. 9, in the log data of the inspection results according to the present example embodiment, the data for identifying each "page" is associated with the data of "defect", "X coordinate", "Y coordinate", "area", and "difference". The data of "defect" consists of identifiers such as "$def_{0001}$", "$def_{0002}$", and "$def_{0003}$" that identify the defects.

"X coordinate" and "Y coordinate" indicate an on-page position at which each defect is detected. "Area" indicates the number of the pixels that form each defect, i.e., the number of the pixels that are detected as a defect on a page. "Difference" indicates a difference between the pixel values of the pixels that form each defect and the pixel values of the pixels of the corresponding master image. Because each defect includes a plurality of pixels, for example, a mean value of the differences calculated for a plurality of pixels may be used as the value for the "difference".

The log data of inspection results depicted in FIG. 9 is generated as follows. As described with reference to FIG. 4, a difference is calculated between the pixels that form a scanned image and the pixels of the corresponding master image, and whether or not each of the pixels of the scanned image is a defect is determined by comparing the calculated difference with a threshold. Then, vertically or horizontally continuous pixels among the pixels that are determined to be defective are integrated and recognized as one defect. Regarding the integration of defective pixels, obliquely continuous pixels may also be integrated in addition to the vertically or horizontally continuous pixels.

The thresholds applied to differences calculated for pixels in the comparison as illustrated in FIG. 4 are not used for detecting a defect, but are used to generate a log of defects as depicted in FIG. 9. The inspection controller 403 according to the present example embodiment determines whether or not a page is defective based on a defect extracted as the log of inspection results, with reference to the data depicted in FIG. 9.

The table illustrated in FIG. 7 and the table illustrated in FIG. 9 are associated with each other by "page" information such as "$page_{0001}$", "$page_{0002}$", and "$page_{0003}$". Accordingly, it becomes possible to generate data in which the presence of a defect is associated with the coloring-material usage rate for each page, by referring to the tables of FIG. 7 and FIG. 9. FIG. 10 depicts the data of the detection results and coloring-material usage rates derived from the data of FIG. 7 and FIG. 9, according to an example embodiment of the present invention. Hereinafter, such data of the detection results and coloring-material usage rates is referred to as "per-page analytical result data". Note that the inspection controller 403 generates the data depicted in FIG. 10 based on the tables depicted in FIG. 7 and FIG. 9. In the present example embodiment, the per-page analytical result data depicted in FIG. 10 is used as inspection results that indicate whether each of the scanned images has been determined to be defective.

As depicted in FIG. 10, in the per-page analytical result data according to the present example embodiment, the data for identifying each "page" is associated with the data of "result" and "coloring-material usage rates" that correspond to the four colors of CMYK. The "result" data is generated based on the "defect" data of FIG. 9, and indicates the presence of a defect on each page.

The inspection controller 403 adopts the "page" data depicted in FIG. 7 as the "page" data in FIG. 10, and refers to the record of the corresponding "page" in the table depicted in FIG. 9. Then, the inspection controller 403 compares the "area" and "difference" data associated with that record with the "threshold area" and "threshold difference" as set in FIG. 11, and sets "NG" to a page that includes at least one unacceptable defect.

On the other hand, "OK" is set to the "result" of a page of no record or a page that has acceptable defects only. When a page includes a plurality of records of defects, the inspection controller 403 extracts all the records whose "difference" exceeds "threshold difference", and compares the total value of "area" of the extracted records with "threshold area". According to the result of the comparison, the inspection controller 403 determines whether or not a page is defective, and sets "OK" or "NG" based on the result of the determination. The data of "coloring-material usage rate" in FIG. 10 corresponds to the data of "coloring-material usage rate" in FIG. 7, and indicates the data of "coloring-material usage rate" that is associated with each page.

Note that the threshold for generating a log, as described above with reference to FIG. 9, is determined based on the thresholds as depicted in FIG. 11. Because the thresholds depicted in FIG. 11 are used to determine whether a page is defective, a greater amount of data can be generated by lowering the threshold for generating a log. For this reason, the threshold for generating a log is set to a value smaller than the specified threshold as depicted in FIG. 11. For example, a half value of the specified value may be used.

The per-page analytical result data as generated above are used to analyze the percent defective in association with the coloring-material usage rate. The analytical results of percent defectives for each coloring-material usage rate according to the present example embodiment are described with reference to FIG. 12. Hereinafter, these analytical results are referred to as coloring-material usage rate percent defective data.

FIG. 12 depicts an example of the coloring-material usage rate percent defective data according to the present example embodiment of the present invention. This coloring-material usage rate percent defective data is used as coloring-material usage amount percent defective data, and the inspection controller 403 serves as an analyzer. The coloring-material usage rate percent defective data depicted in FIG. 12 corresponds to the image inspection results used by the image inspection system according to the present example embodiment.

As depicted in FIG. 12, the coloring-material usage rate percent defective data according to the present example embodiment includes the data of "object range", "threshold difference", and "threshold area" that indicates preconditions for inspection, and the data of "number of outputs" and "percent defective" that is calculated for each range of "coloring-material usage rate". The "object range" indicates the number of the pages that are inspected, and corresponds to the number of pages listed in the per-page analytical result data of FIG. 10. The "threshold area" and "threshold difference" are set values described above with reference to FIG. 11. The "percent defective" may be calculated by a variety of methods, and may also be referred to as "defect rate".

The "coloring-material usage rate" depicted in FIG. 12 indicates ranges in which the "coloring-material usage rate" for each of CMYK depicted in FIG. 10 is divided into certain prescribed ranges. In other words, the "coloring-material usage rate" of FIG. 12 is used as a coloring-material usage range. In the present example embodiment, the coloring-material usage range is divided into the ranges of "0-5%", "5-20%", "20-40%", and "41%-".

The "number of outputs" and "percent defective" indicate the analyzed result of the per-page analytical result data depicted in FIG. 10. For example, the record of "$page_{0001}$" as depicted in FIG. 10 indicates the "coloring-material usage rate" of "4%", "3%", "10%", and "32%" for C, M, Y, and K, respectively. Accordingly, the inspection controller 403 increases the "number of outputs" in FIG. 12 by 1 for "0-5%", "0-5%", "0-5%", and "20-41%" of the rows of "C", "M", "Y", and "K", respectively.

Further, the inspection controller 403 increases the parameter of the number of defects, which is associated with the "number of outputs", by 1 when the "result" of the record indicates "NG". The parameter of the number of defects is used to calculate the "percent defective" illustrated in FIG. 12.

The inspection controller 403 repeats increasing the "number of outputs" as described above for all the records, i.e., all the pages, that are to be inspected in the per-page analytical result data of FIG. 10. Accordingly, the total value of the "number of outputs" of the cells of each row of CMYK eventually reaches the number of pages set to the "object range". Further, the inspection controller 403 calculates the "percent defective" by dividing the number of defects, which is increased in association with the "number of outputs", by the "number of outputs". By so doing, the inspection controller 403 completes the generation process of the table of the coloring-material usage rate percent defective data depicted in FIG. 12.

The generated coloring-material usage rate percent defective data generated by the inspection controller 403 as above is sent to the inspection log processing unit 103, and is used for predicting a defect incidence rate. For this reason, the inspection controller 403 transmits the generated coloring-material usage rate percent defective data as depicted in FIG. 12 to the inspection log processing unit 103.

Figure 13:
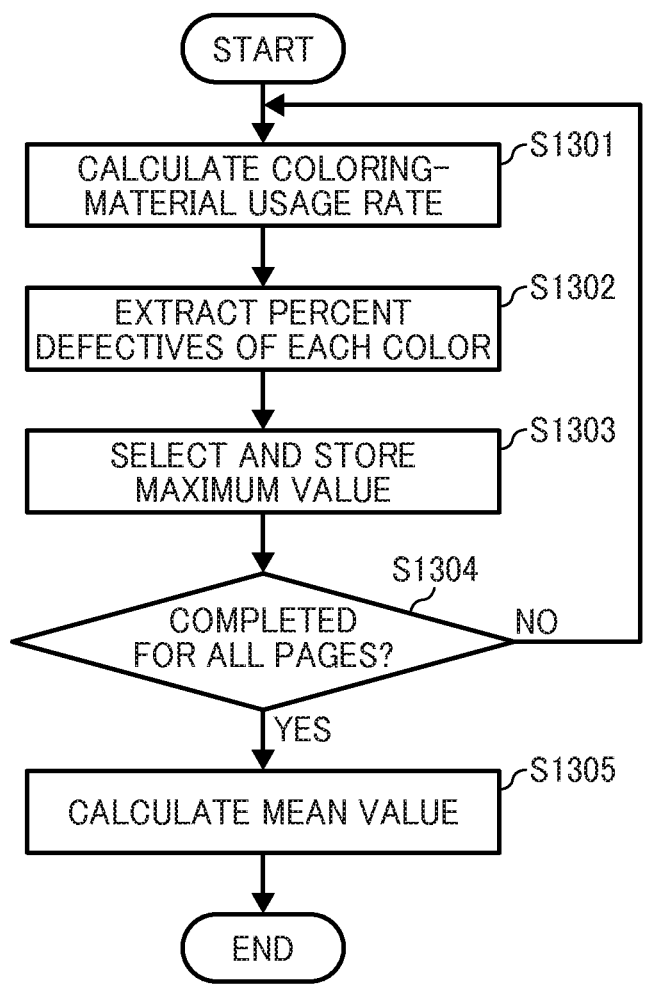
FIG. 13 is a flowchart illustrating the processes of predicting a percent defective according to an example embodiment of the present invention.

Next, the processes of predicting a percent defective performed by the inspection log processing unit 103 according to the present example embodiment are described. FIG. 13 is a flowchart illustrating the processes of predicting a percent defective according to the present example embodiment of the present invention. The processes depicted in FIG. 13 are performed as the job information processing unit 101 receives a new job and the RIP 102 generates the bit map data of each page.

As illustrated in FIG. 13, when the RIP 102 generates bit map data for a page, the inspection log processing unit 103 calculates a coloring-material usage rate for the generated page (S1301). As described above, the bit map data is generated for each color of CMYK. In other words, the inspection log processing unit 103 calculates a coloring-material usage rate for each of CMYK, in S1301. The coloring-material usage rate is calculated by dividing the number of the color pixels by the total number of the pixels.

Next, the inspection log processing unit 103 extracts the percent defectives of each color from the coloring-material usage rate percent defective data depicted in FIG. 12, based on the coloring-material usage rate calculated for each color (S1302). In S1302, the inspection log processing unit 103 refers to the rows in the coloring-material usage rate percent defective data of FIG. 12 based on the coloring-material usage rate calculated for each color, and extracts the value of "percent defective" that corresponds to the coloring-material usage rate calculated for each color.

The values as extracted above are used as predicted values for the percent defectives of that page. That is, the inspection log processing unit 103 serves as a defect incidence rate prediction unit that calculates coloring-material usage rates of a to-be-output image, which is to be formed and output, based on the data of the pixels that form the to-be-output image, and predicts a rate at which a defect occurs when the to-be-output image is formed and output, based on the coloring-material usage rate percent defective data. Such a function is realized by using the coloring-material usage rate percent defective data that indicates the percent defectives for ranges of coloring-material usage rate.

After the percent defectives of each color are extracted, the inspection log processing unit 103 selects the maximum value from the extracted percent defectives, and temporarily stores the selected maximum value in a storage medium (S1303). A process of calculating a mean value may be substituted for the processes of S1303 in which the maximum is selected. The inspection log processing unit 103 repeats S1301 to S1303 until the processes in these steps are completed for all the pages for which bit map data is to be generated by the RIP 102 ("NO" in S1304). When the processes are completed for all the pages ("YES" in S1304), the inspection log processing unit 103 calculates a mean value of the percent defectives calculated for all the pages and stored in the storage medium in S1303 (S1305). Then, the process terminates.

Figure 14A:
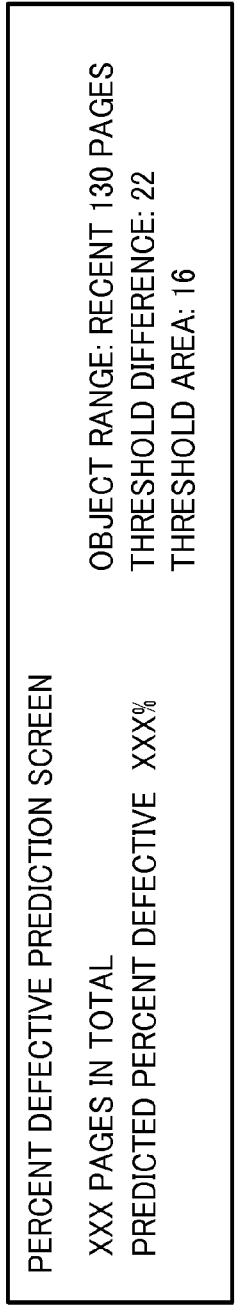
FIG. 14A depicts a percent defective prediction screen according to an example embodiment of the present invention.

By performing these processes, the inspection log processing unit 103 obtains percent defectives that are predicted based on the coloring-material usage rates and inspection logs of pages, for the number of pages of a print job to be performed and the entire print job. Based on the data obtained as above, the inspection log processing unit 103 generates and outputs display data that is used to display a screen, as depicted in FIG. 14A. In other words, the inspection log processing unit 103 serves as a predicted percent-defective output unit. FIG. 14A depicts a percent defective prediction screen according to the present example embodiment.

As depicted in FIG. 14A, "number of pages in total" and "predicted percent defective" of a print job to be performed are displayed on a percent defective prediction screen according to the present example embodiment, in addition to the "object range", "threshold difference", and "threshold area" described above with reference to FIG. 12. In other words, the inspection log processing unit 103 outputs the data such as the "object range", "threshold difference", and "threshold area" in association with the predicted percent defective. Due to such a display, it becomes possible for an operator of the image inspection system to ascertain a prediction value for the percent defective of a print job to be performed, and to use that information to determine whether the print job is to be performed or device maintenance is to be carried out. Because the "object range", "threshold difference", and "threshold area" are displayed in association with the predicted percent defective, an operator can know the preconditions for the "predicted percent defective".

FIG. 14A depicts an example in which only the mean value of the pages in total, which is calculated in S1305, is displayed as a prediction value for the percent defective. However, the prediction value for the percent defective on each page is also stored in the process of S1303. Accordingly, it is possible to display the percent defective of each page in addition to the mean value, as depicted in FIG. 14B.

Figure 14B:
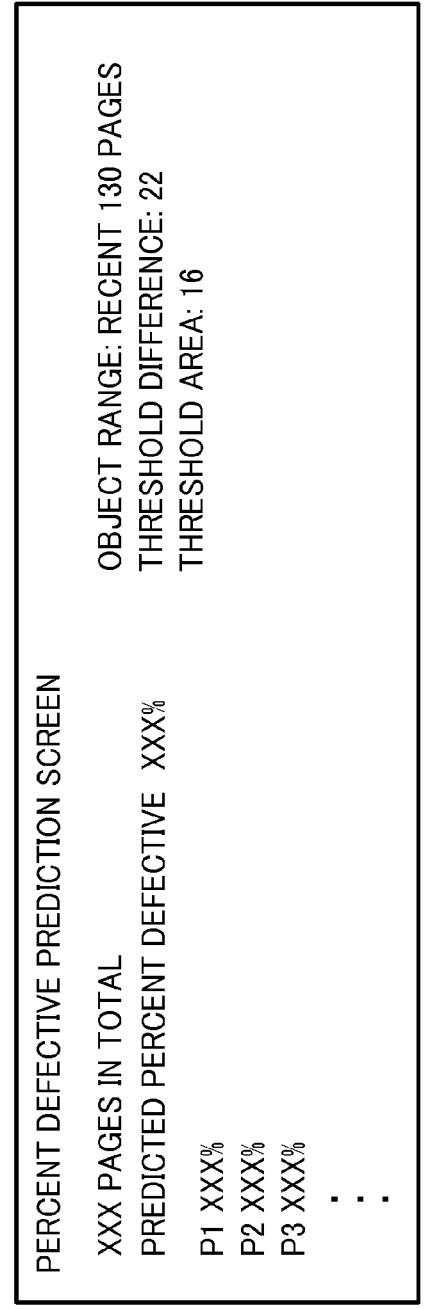
FIG. 14B depicts a percent defective prediction screen according to an example embodiment of the present invention.

The "predicted percent defective" of FIGS. 14A and 14B indicates a percent defective predicted based on the coloring-material usage rate percent defective data depicted in FIG. 12, i.e., the inspection log data, and indicates a value that corresponds to the coloring-material usage rate in the print job to be performed. In other words, differences in percent defective from the percent defectives associated with coloring-material usage rates of the print job to be performed are taken into consideration in the "predicted percent defective" of FIGS. 14A and 14B. The screens depicted in FIGS. 14A and 14B are displayed on a display that serves as an user interface of the DFE 1, or on an information processing terminal that is used to remotely control the DFE 1 through a network.

As described above, accuracy in the prediction of defect incidence rate is improved according to the image inspection system of the present example embodiment. In the example embodiments described above, cases in which the processes depicted in FIG. 13 are performed by the DFE 1 have been described. Because the coloring-material usage rates of the image included in the print job to be performed are used in the processes depicted in FIG. 13, the processes can efficiently be performed when these processes are performed by the DFE 1.

However, the bit map data generated by the RIP 102 is also sent to the inspection apparatus 4 through the engine controller 2 in order to create a master image. Accordingly, it is also possible for the inspection apparatus 4 to perform the processes depicted in FIG. 13 by using the bit map data received at the master-image processing unit 402.

Second Embodiment

In the first example embodiment, cases have been described in which the per-page analytical result data depicted in FIG. 10 is generated based on the predetermined "threshold area" and "threshold difference" and the coloring-material usage rate percent defective data depicted in FIG. 12 is generated based on the generated per-page analytical result data. Accordingly, the thresholds used to generate the per-page analytical result data of FIG. 10 are used to predict the percent defectives on the percent defective prediction screen depicted in FIGS. 14A and 14B.

However, there could be cases in which the "predicted percent defective" is referred to on the screen such as those of FIGS. 14A and 14B but that "predicted percent defective" is unacceptably high. In such cases, an operator may wish to loosen the threshold, i.e., increase the permissible range of defect, to reduce the predicted percent defective" to an acceptable level. The operator then executes a print job after he/she has confirmed that the predicted percent defective" is reduced to an acceptable level.

In such cases, it is desired that the screen such as those of FIGS. 14A and 14B be updated as the threshold is changed, and that the "predicted percent defective" be displayed upon being updated in accordance with the updated threshold. In the present example embodiment, a system that realizes such displaying is described. Note that like reference signs are given to elements similar to those described in the first example embodiment, and their detailed description is omitted.

FIG. 15 is a sequence diagram in which the per-page analytical result data depicted in FIG. 10 is recalculated when the threshold is updated on the percent defective prediction screen depicted in FIGS. 14A and 14B, according to the present example embodiment. As depicted in FIG. 15, the inspection log processing unit 103 receives a request to modify a threshold (S1501), and transmits the modified threshold to the inspection controller 403 (S1502). In other words, the inspection log processing unit 103 serves as a threshold modification request reception unit.

After the modified threshold is received, the inspection controller 403 updates the thresholds illustrated in FIG. 11, and regenerates the per-page analytical result data depicted in FIG. 10 in accordance with the updated thresholds (S1503). In other words, the inspection controller 403 refers to the log data of the inspection results illustrated in FIG. 9 again in S1503, and performs processes to generate per-page analytical result data in accordance with the updated thresholds.

After the per-page analytical result data is regenerated in accordance with the updated thresholds, the inspection controller 403 regenerates the coloring-material usage rate percent defective data depicted in FIG. 12 in accordance with the regenerated per-page analytical result data (S1504). Accordingly, the coloring-material usage rate percent defective data that corresponds to the updated thresholds is generated. The inspection controller 403 transmits the generated coloring-material usage rate percent defective data to the inspection log processing unit 103 (S1505).

After the coloring-material usage rate percent defective data is updated from the inspection controller 403, the inspection log processing unit 103 performs the processes depicted in FIG. 13 to obtain the predicted percent defective (S1506), and outputs the data for displaying the percent defective prediction screen described above with reference to FIGS. 14A and 14B (S1507). Then, the process terminates. By performing these processes as described above, a predicted percent defective that is based on the updated threshold can be displayed when the threshold is changed.

Third Embodiment

Next, another embodiment is described in which the "predicted percent defective" is displayed in accordance with the updated threshold. In the present example embodiment, the "predicted percent defective" is calculated in advance in accordance with a plurality of thresholds. FIG. 16 is a table of predicted percent defectives that correspond to a plurality of thresholds, which are generated by an image inspection system according to the present example embodiment of the present invention. Hereinafter, such a table is referred to as a "threshold-specific predicted percent defective table".

As depicted in FIG. 16, the threshold-specific predicted percent defective table according to the present example embodiment represents a matrix of a plurality of values of "threshold area" and "threshold difference". In each cell of the matrix, a "predicted percent defective" that corresponds to a certain combination of the values of "threshold area" and "threshold difference" is given. Each of the predicted percent defectives set to the cells of the table depicted in FIG. 16 is calculated by the processes described above with reference to FIG. 13.

For this reason, when per-page analytical result data as depicted in FIG. 10 is generated, the inspection controller 403 of the inspection apparatus 4 generates per-page analytical result data with increased and decreased values of "threshold area" and "threshold difference", in addition to the per-page analytical result data of the thresholds given in FIG. 11. This data is used as spare inspection results. In the present example embodiment, per-page analytical result data with ±5 increased and decreased values of "threshold area" and "threshold difference" is generated as depicted in FIG. 16, in addition to the per-page analytical result data of the predetermined threshold area "22" and threshold difference "16". Accordingly, nine cells of per-page analytical result data are generated as depicted in FIG. 16.

After these nine cells of per-page analytical result data are generated as depicted in FIG. 16, the inspection controller 403 then generates coloring-material usage rate percent defective data as depicted in FIG. 12, based on each of the nine cells of per-page analytical result data. In other words, the inspection controller 403 generates spare coloring-material usage rate percent defective data based on the spare inspection results, in addition to the coloring-material usage rate percent defective data generated based on the inspection results that are generated by using the originally-set values.

Accordingly, nine pieces of coloring-material usage rate percent defective data that corresponds to the nice cells of FIG. 16 are generated. The inspection controller 403 transmits the nine pieces of coloring-material usage rate percent defective data as generated above to the inspection log processing unit 103. After these nine pieces of coloring-material usage rate percent defective data are received, the inspection log processing unit 103 performs the processes depicted in FIG. 13 for each of the nine pieces of coloring-material usage rate percent defective data to generate the threshold-specific predicted percent defective table as depicted in FIG. 16.

When it is recognized that the threshold has been changed by an operator, the inspection log processing unit 103 calculates a predicted percent defective in accordance with the changed threshold, by referring to the threshold-specific predicted percent defective table depicted in FIG. 16.

For example, when new set values of "22" and "12" are given as the threshold area and the threshold difference, respectively, the inspection log processing unit 103 firstly calculates a difference between the predicted percent defective of the cell corresponding to threshold area "22" and threshold difference "11" and the predicted percent defective of the cell corresponding to threshold area "22" and threshold difference "16". Then, the inspection log processing unit 103 divides the calculated difference by "5", which is the difference between threshold differences "11" and "16", and fills in the gaps of predicted percent defective between threshold differences "11" and "16" by using the divided value.

In the above case, the divided value is added to the predicted percent defective that corresponds to threshold difference "11" in order to obtain the predicted percent defective that corresponds to threshold difference "12". Accordingly, a predicted percent defective that corresponds to threshold area "22" and threshold difference "12" is obtained by a linear calculation. When the set values of both "threshold area" and "threshold difference" are changed, a predicted percent defective that corresponds to the changed thresholds can be obtained by performing the above linear calculation twice.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image inspection system comprising:
    a read-image acquisition unit configured to acquire a read image obtained by reading an output image;
    an inspection image generation unit configured to generate an inspection image for inspecting the read image based on data of a to-be-output image;
    an inspection result acquisition unit configured to acquire an inspection result including a determination whether the read image is defective, based on a difference between the inspection image and the read image;
    a coloring-material usage data acquisition unit configured to acquire coloring-material usage data indicating extent of coloring-material usage in the output image, the coloring-material usage data being read when the read image is generated;
    an analyzer configured to generate coloring-material usage defect rate data indicating a defect rate in association with coloring-material usage, based on the inspection result and the coloring-material usage data;
    a defect incidence rate prediction unit configured to obtain coloring-material usage of the to-be-output image, based on data of pixels forming the to-be-output image, and predict a rate of occurrence of a defect when the to-be-output image is output, based on the coloring-material usage defect rate data; and
    a predicted defect-rate output unit configured to output display data used to display a predicted defect rate indicating a rate of occurrence of a defect when the to-be-output image is output.

2. The image inspection system according to claim 1, wherein the predicted defect rate output unit outputs, in association with the predicted defect rate, a threshold applied to the difference between the inspection image and the read image to determine whether the read image is defective.

3. The image inspection system according to claim 2, further comprising:
    a threshold modification request reception unit configured to receive a modification request for the threshold output in association with the predicted defect rate,
    wherein:
    the inspection result acquisition unit acquires a threshold modified in response to the modification request, and acquires an inspection result including a determination whether the read image is defective by applying the modified threshold to the difference between the inspection image and the read image;
    the analyzer regenerates coloring-material usage defect rate data indicating a defect rate in association with coloring-material usage, based on the coloring-material usage data and an inspection result updated with the modified threshold; and
    the defect incidence rate prediction unit predicts again a rate of occurrence of a defect when the to-be-output image is output, based on the regenerated coloring-material usage defect rate data.

4. The image inspection system according to claim 2, further comprising:
    a threshold modification request reception unit configured to receive a modification request for the threshold output in association with the predicted defect rate,
    wherein:
    the inspection result acquisition unit acquires an inspection result including a determination whether the read image is defective by applying the threshold to the difference between the inspection image and the read image, and acquires an auxiliary inspection result including a determination whether the read image is defective by applying a modified threshold obtained by increasing or decreasing the threshold to the difference between the inspection image and the read image;
    the analyzer generates the coloring-material usage defect rate data based on the inspection result and the coloring-material usage data, and generates spare coloring-material usage defect rate data based on the spare inspection result and the coloring-material usage data; and the defect incidence rate prediction unit predicts a rate of occurrence of a defect when a threshold modified in response to the modification request is applied to the difference between the inspection image and the read image and the to-be-output image is output, based on the coloring-material usage defect rate data and the spare coloring-material usage defect rate data.

5. The image inspection system according to claim 1, wherein:
the inspection image generation unit refers to pixels of the image to be output to generate the inspection image, and
the coloring-material usage data acquisition unit calculates using the referred pixels of the image to be output, to obtain the coloring-material usage data.

6. The image inspection system according to claim 1, wherein the inspection result acquisition unit acquires inspection log data, the inspection log data being determined to be stored by applying a threshold for determining whether or not data is to be stored to the difference between the inspection image and the read image, and acquires an inspection result including a determination whether the read image is defective by applying a threshold for determining whether or not the read image is defective to the inspection log data.

7. The image inspection system according to claim 1, further comprising: a print engine configured to form an image on a recording sheet, and output as the output image.

8. A method of inspecting an image, the method comprising:
acquiring a read image obtained by reading an output image;
generating an inspection image for inspecting the read image based on data of a to-be-output image;
acquiring an inspection result including a determination whether the read image is defective, based on a difference between the inspection image and the read image;
acquiring coloring-material usage data indicating extent of coloring-material usage in the output image, the coloring-material usage data being read when the read image is generated;
generating coloring-material usage defect rate data indicating a defect rate in association with coloring-material usage, based on the inspection result and the coloring-material usage data;
obtaining coloring-material usage of the to-be-output image, based on data of pixels forming the to-be-output image, and predicting a rate of occurrence of a defect when the to-be-output image is output, based on the coloring-material usage defect rate data; and
outputting display data used to display a predicted defect rate indicating a rate of occurrence of a defect when the to-be-output image is output.

9. A computer-readable non-transitory recording medium storing a program for causing a computer to execute a method, the method comprising:
acquiring a read image obtained by reading an output image;
generating an inspection image for inspecting the read image based on data of a to-be-output image;
acquiring an inspection result including a determination whether the read image is defective, based on a difference between the inspection image and the read image;
acquiring coloring-material usage data indicating extent of coloring-material usage in the output image, the coloring-material usage data being read when the read image is generated;
generating coloring-material usage defect rate data indicating a defect rate in association with coloring-material usage, based on the inspection result and the coloring-material usage data;
obtaining coloring-material usage of the to-be-output image, based on data of pixels forming the to-be-output image, and predicting a rate of occurrence of a defect when the to-be-output image is output, based on the coloring-material usage defect rate data; and
outputting display data used to display a predicted defect rate indicating a rate of occurrence of a defect when the to-be-output image is output.

\* \* \* \* \*